United States Patent [19]

Rieder et al.

[11] Patent Number: 5,010,655
[45] Date of Patent: Apr. 30, 1991

[54] INCREMENTAL MEASURING SYSTEM

[75] Inventors: Heinz Rieder, Oberndorf; Max Schwaiger, Ostermiething, both of Austria

[73] Assignee: Sentop Rieder und Schwaiger Gesellschaft m.b.H., Tarsdorf, Austria

[21] Appl. No.: 470,110

[22] Filed: Jan. 25, 1990

[30] Foreign Application Priority Data

Feb. 9, 1989 [AT] Austria ................... 275/89

[51] Int. Cl.$^5$ ............................................. G01B 11/04
[52] U.S. Cl. ........................................ 33/706; 33/707; 250/237 G; 356/373
[58] Field of Search .................. 33/706, 707, 708, 700, 33/701, 703, 705, 1 L, 819, 820; 250/211 K, 237 G; 356/373, 374

[56] References Cited

U.S. PATENT DOCUMENTS

| 3,708,681 | 1/1973 | Ivers | 356/374 |
| 4,101,764 | 7/1978 | Nelle | 250/237 G |
| 4,363,964 | 12/1982 | Schmitt | 250/237 G |
| 4,477,189 | 10/1984 | Ernst | 33/707 |
| 4,731,530 | 3/1988 | Mikan | 250/211 K |
| 4,874,941 | 10/1989 | Spillman, Jr. | 250/237 G |
| 4,928,008 | 5/1990 | Huggins et al. | 250/237 G |

FOREIGN PATENT DOCUMENTS 0239768 2/1987 European Pat. Off. .
1814785 12/1968 Fed. Rep. of Germany .
2540412 11/1975 Fed. Rep. of Germany .
3445694 12/1984 Fed. Rep. of Germany .

Primary Examiner—William A. Cuchlinski, Jr.
Assistant Examiner—Alvin Wirthlin
Attorney, Agent, or Firm—Kurt Kelman

[57] ABSTRACT

A scale member is provided with a scale, which can be optoelectronically scanned. In association with that scale, a scanning unit is provided, which comprises scanning sets for generating measured-value signals, and an evaluating unit is provided for deriving digital countable signals from said measured-value signals. A reference track comprising a plurality of reference marks is provided on the scale member and is parallel to the scale and the scanning unit comprises scanning sets for scanning the reference track. A control circuit is provided, which permits a generation or delivery of reference pulses only in response to the scanning of selected ones of the reference marks. To permit such selection, the scale member is provided with a control track, which can be scanned by the same method as the scale and the reference marks and which has a signal-generating characteristic which varies along the scale so that a signals have different levels are generated by an associated scanning set. The reference signal delivering circuit 17 will not be enabled to deliver a reference pulse unless the level which currently appears at the scanning set associated with the control track is equal to a level which has been preselected by a level adjuster.

21 Claims, 2 Drawing Sheets

INCREMENTAL MEASURING SYSTEM

BACKGROUND OF THE INVENTION

1. Field of the Invention

This invention relates to an incremental measuring system, particularly a length measuring system, comprising a scale member provided with a scale which is adapted to be scanned preferably by an optoelectronic scanning method, a scanning unit provided with scanning sets for scanning said scale and for generating measured-value signals in response to the scanning of the scale, and an evaluating unit for deriving digital countable signals from said measured-value signals, wherein said scale member is also provided with a reference track that is parallel to said scale and comprises a plurality of reference marks associated with respective reference points at fixed locations on said scale member, the scanning unit comprises reference mark scanning sets for scanning said reference marks, said scale member is also provided with a control track and a reference signal delivering circuit is provided, which under the control of said control track delivers reference pulses only in response to the scanning of selectable ones of said reference marks.

2. Description of the Prior Art

Such measuring systems are known, e.g., from Published German Application No. 34 45 694 and permit an optoelectronic scanning of the scale by the scanning unit preferably in a non-contacting manner. Other known measuring systems comprise scales which can be scanned by inductive or magnetic or capacitive methods and are provided with corresponding reference marks. The measured-value signals which are generated in response to the scanning of the scale are periodic analog signals, which in most cases are basically sinusoidal and which comprise a complete signal period for each complete increment of the scale, which increment in case of an optoelectronic scanning consists of a bright field and a dark field of the scale. In the previous practice, two measured-value signals were generated, which in most cases were displaced 90° in phase. In dependence on the direction of movement of the scanning unit, one of said signals or the other will lead the other and the direction of movement of the scanning unit is indicated by signals generated by a direction detector. The analog measured-value signals are processed to provide digital countable signals. The scale may be electronically or arithmetically subdivided, in most cases by a microcomputer. The digital countable signals may be used to control a machine or a robot and/or to display the result of the machine or a robot and/or to display the result of the measurement on a display unit. To establish a definite relationship between the countable signals and the locations at which the scale is being scanned, the counting means must be set to predetermined values, such as zero, when the scale member is being scanned at predetermined or preselectable locations. This is accomplished with the aid of reference signals, which are generated is response to the scanning of the reference track. When the counter is set to a defined value in response to the reference signal, that value will indicate the location that is associated with a selected zero point of the display to the associated reference mark. A plurality of reference marks may be provided and will permit a generation of reference pulse at selected locations in various length portions of the scale. In that case it will be necessary to identify the reference mark which is being approached so that the control or conversion can be related to a certain location on the scale member. Expensive control and switching systems have previously beend used to distinguish selected reference marks from non-selected ones. Alternatively, non-selected reference marks may be covered or removed although this is an expensive operation if the measuring system is encapsulated, as will mostly be the case, and can be performed only by skilled labor and reference marks which have been destroyed cannot be re-applied. Known selecting systems comprise mechanical on-off switches, which have been disclosed in Published German Application No. 18 14 785 and are actuated by separate stops during the movement of the scanning unit and which activate or enable the control circuit only in response to the scanning of pre-selected reference marks. In accordance with German Patent Publication No. 24 40 412 said mechanical switches have been replaced by magnets, which are attached to the scale member at preselected locations and serve to actuate selector switches, which are provided in the scanning unit and consist of reed relays. It is also known to provide the reference marks in a plurality of reference tracks and to associate a scanning unit with each track and to define a reference mark in that the scanning unit which is associated with a given track is enabled to select reference signals. In that case too a change of the reference marks and the setting operation require a considerable expenditure of work, time and equipment and can be performed only by skilled labor. Whereas erasable reference marks may be attached at closely spaced locations, all reference marks which are not required at a given time must be mechanically removed or must be covered by stuck-on slips. That practice also involves the disadvantages mentioned above. For this reason it has been proposed in EP-A-0 239 768 to remove two reference marks which are disposed on opposite sides of and spaced equal distances from a selected reference mark and to scan the reference marks with two scanning sets having the same spacing as the reference marks and arranged in an antiparallel connection. In that case the reference signals produced by existing reference marks will eliminate each other and a usable reference signal will not be generated unless an existing reference mark and the region of a reference mark which has been removed are scanned at the same time. In that case the reference marks must be provided with an exactly uniform spacing and the scanning sets must not depart even by an extremely small distance from a desired position relative to the scale and to the reference track. In that case too a subsequent change of the selected reference marks will either involve a high expenditure or will be impossible.

SUMMARY OF THE INVENTION

It is an object of the invention to provide a measuring system which is of the kind described first hereinbefore and in which reference points associated with one or more reference marks can be defined and can be selected in case of need without an intervention into an encapsulated measuring system.

It is another object of the invention to accomplish the first-mentioned object in a highly reliable manner and with a low circuit expenditure.

It is a further object of the invention to provide such a measuring system in which the direction of movement of the scanning unit along the scale can be more easily detected.

The first object mentioned above is accomplished in that the control track provided on the scale member is adapted to be scanned by the same method as the scale and the reference marks and at least adjacent to the reference marks has signal-generating characteristic which vary along the scale so that the associated scanning set is adapted to generate signals having different amplitudes in response to the scanning of the control track adjacent to different reference marks, and that the reference signal delivering circuit is adjustable to respond to different signal levels and a reference signal which has been generated in response to the scanning of a reference mark will not be delivered to the evaluating unit unless the preselected signal level occurs in response to the scanning of the control track.

In accordance with the invention the control track is scanned by the same method as the scale and the reference mark. Particularly the means for generating and processing the signals are simpler than in the known systems because the control track can be scanned by simple means. In response to the scanning of the control track at least adjacent to the reference marks, signals will be generated which change along the scale so that an additional measuring system, which is an absolute-value system, will virtually be provided. That additional measuring system may be used to generate measured-value signals which can be used for a rough determination of the position of the scanning unit relative to the scale member. A selection of reference marks can be effected without a need for an intervention into the measuring system proper and can be achieved by a selection or setting of signal levels and such selection of reference marks can be changed in case of need.

In a preferred embodiment the control track has a signal-generating characteristic which changes continuously aloing the scale. In that case the signal level which occurs in response to the scanning of the control track will constitute an absolute value which indicates that location at which the scale is being scanned by the scanning unit. The change of the signal level in response to the scanning unit will also indicate the direction of movement of said unit so that there is no need to provide separate direction detectors for an evaluation of the measured-value signals.

If the scale member is very long, it may be difficult to provide a control track which has a signal-generating characteristic which varies sufficiently throughout the length of the scale. In that case a plurality of control tracks may be associated with respective length portions of the scale and each of them may consist of a portion which is periodically repeated along respective length portions of the scale and has a carrying signal-generating characteristic, and a non-changing control portion, consisting, e.g., of solid lines or blank areas on both sides of the changing track, so that a given portion in which the control track is being scanned can be detected in dependence on the outer lines or areas and the exact location at which the control track is being scanned in that portion can be detected in dependence on the varying control track.

The additional track may be utilized only for a determination or selection of certain reference marks rather than as an absolute-value scale or as a track for a detection of the direction of the scanning movement. In that case it will be possible to omit the control track between the reference marks and/or to the control may have a constant signal-generating characteristic between the reference marks. Particularly if the scale is very long it will then be possible to associate control track portions having distinctly different characteristics with different reference marks. In that case, care will be taken in the scanning of the scale member that the varying portion of the control track will be scanned before the scanning of the associated reference mark.

In a preferred embodiment the scanning and signal generation are performed by an optoelectronic method and the control track consists of a bar pattern which changes in bar density and/or bar width along the scale. The bars may extend along the scale or may be at right angles or oblique to the scale and bars extending along the scale may taper from one end of the scale to the other. In another embodiment the control track consists of a dot pattern and the dot density and/or dot size varies along the scale. Just as the reference track, the control track may be provided by a photolithographic method at the same time as the scale.

In a preferred embodiment the control circuit comprises memories or level adjusters for defining preset signal levels associated with respective reference marks and also comprises a comparator circuit which will permit the generation of a reference signal in response to the scanning of an associated reference mark or a delivery of such reference signal only in response to a coincidence of the level of the signal generated by the scanning of the control track and the preset level. The level will be adjusted in the simplest case by means of adjustable circuit components, such as potentiometers. If the evaluating unit comprises a computer, a reference mark to be selected may be scanned and the signal level generated in response to the scanning of the control track adjacent to the selected reference mark or an equivalent digital value may be stored in a memory of the computer. For a selection of that reference mark that stored value is then applied to the comparator circuit. It will be understood that a continuous power supply for such ROW's will be provided for continuous operation. In case of need the memory can be replaced by another or the adjusted level may be altered without an intervention into the interior of the measuring system.

DETAILED DESCRIPTION OF THE PREFERRED EMBODIMENT

Figure 1:
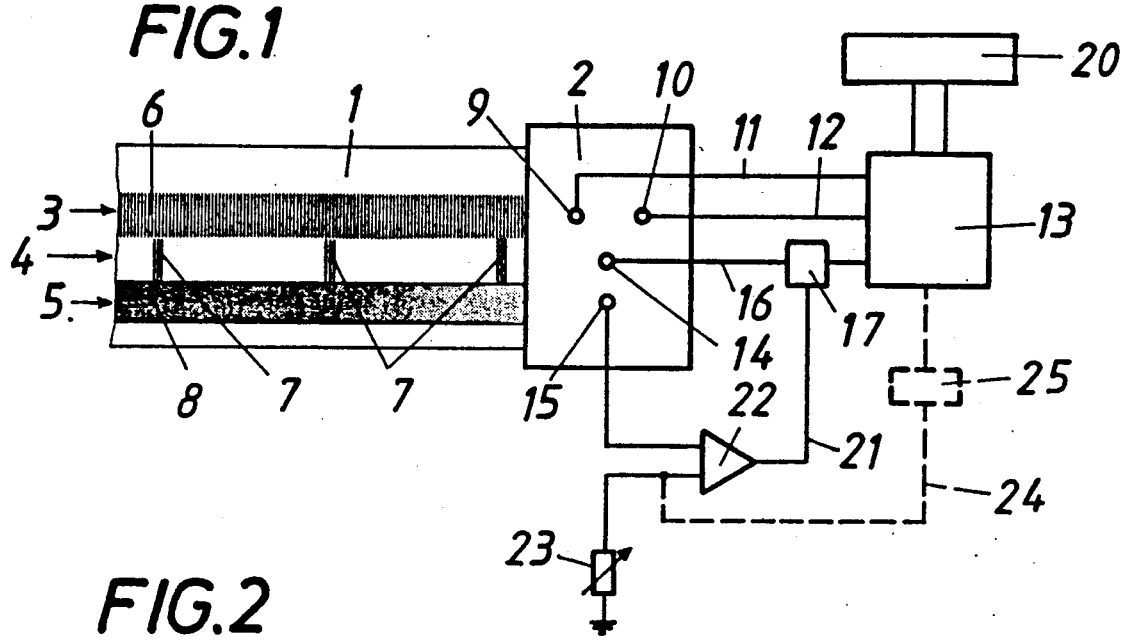
FIG. 1 is a diagrammatic elevation showing an incremental measuring system for optoelectronic scanning and a block circuit diagram of an associated evaluating unit.

An illustrative embodiment of the invention will now be described with reference to the drawing.

A scale member 1 consisting, e.g., of glass, and provided with an incremental scale 6 and a scanning unit 2, which is movable along the scale 6 and are accommodated in a tubular enclosure, not shown. The tubular enclosure is formed with a longitudinally extending slot, which is covered by sealing lips, between which a swordlike actuating member extends, which can be used to move the scanning unit 2 along the scale 6. That swordlike actuating member may be connected, e.g., to a tool carriage of a machine tool.

The scale member 1 is provided with three longitudinally extending tracks 3, 4 and 5. The track 3 is provided with the scale 6. The track 4 is a reference track provided with reference marks 7. The track 8 is a control track. The scanning unit 2 is provided with means for optoeletronically scanning each of said tracks. Specifically, four scanning sets consisting each of a scanning grating and a photoelectric receiver may be provided for scanning the scale 6. Said scanning gratings are offset from each other by fractional parts of an increment of the scale 6. The photo-electric receivers are arranged in pairs and the receivers of each pair are arranged in an antiparallel connection. In response to the scanning of the scale 6, sinusoidal analog measuring signals which are displaced 90° in phase appear at respective terminals 9 and 10 of the scanning unit 2 and are delivered via respective lines 11, 12 to an evaluating unit 13. Separate illuminating means may be provided for the above-mentioned photoelectric receivers and for additional photoelectric receivers which will be described hereinafter. The tracks 3, 4 and 5 may be scanned with incident light, transmitted light or reflected light; in the latter case the scale member is preferably metallized on its rear surface.

The scanning set which is associated with the reference track 4 comprises a photoelectric receiver 14 and scans said track through a scanning grating, which is so designed in dependence on each reference mark 7 that the receiver 14 will generate a reference mark signal when said grating is in a predetermined position relative to said reference mark. That reference mark signal usually has very steep edges and is delivered via a line 16 to a reference signal delivering circuit 17.

Figure 2:
FIGS. 2 to 4 are enlarged views showing various control tracks.
Figure 3:
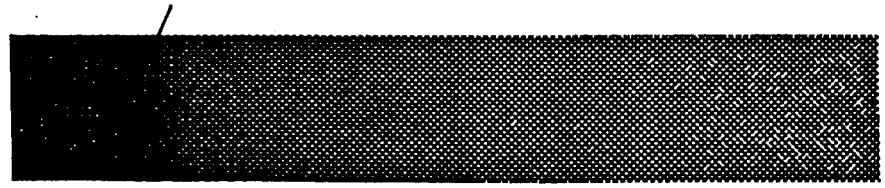
Figure 4:
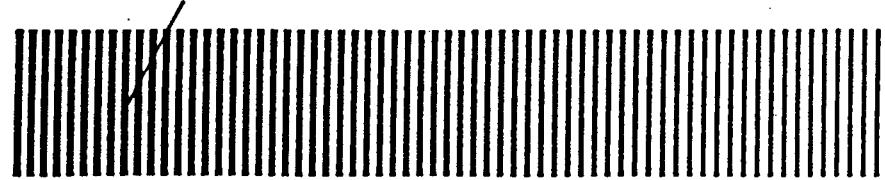
Figure 1A:
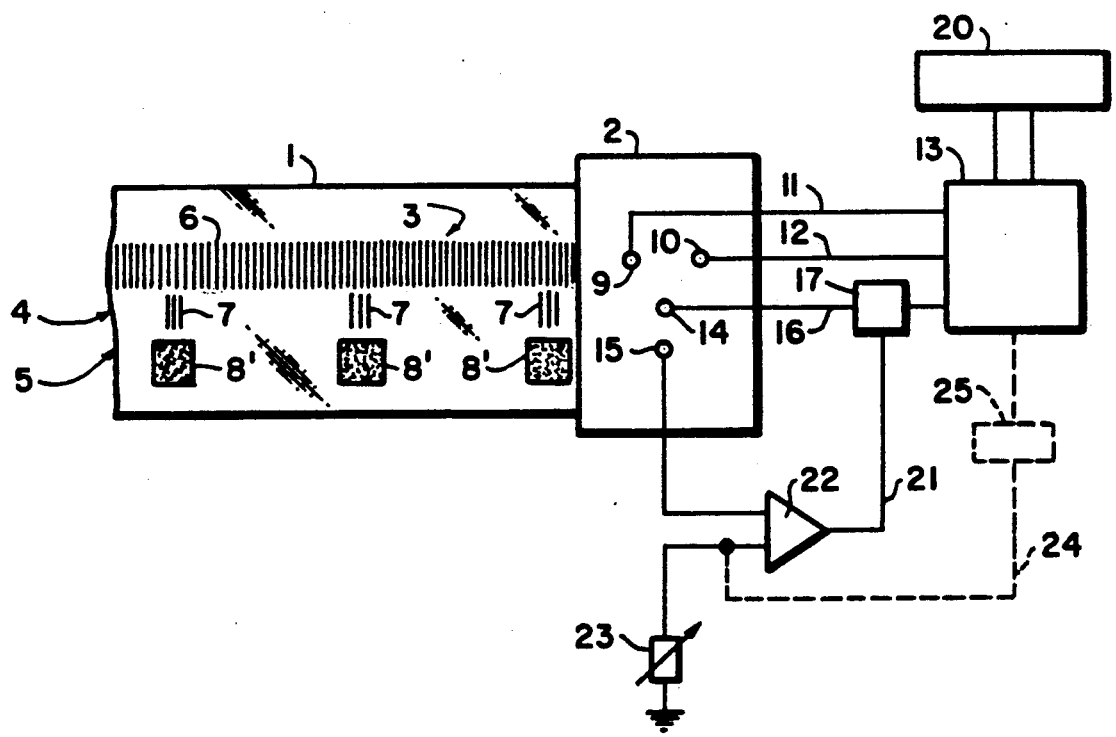
FIG. 1a is a like view, showing a modification of the control track.

The scanning set for scanning the control track 5 comprises a photoelectric receiver 15 and a scanning window associated with the receiver 15. The control track 5 may be designed as shown in FIGS. 2, 3 or 4. The control track 8 shown in FIG. 1 is the same as that of FIG. 3. The control track 18 shown in FIG. 2 consists of a pattern of bars which extend along the scale 6 and taper from the left-hand end to the right-hand end of the scale 6. The control track 8 shown in FIG. 3 consists of a pattern of dots which vary in size along the scale 6. The control track 19 shown in FIG. 4 is another pattern of bars which have a uniform spacing but vary in width along the scale 6. As shown in FIG. 1a, respective portions 8' of the control track may register with respective reference marks 7, and the control track is blank between adjacent cointrol track portions 8'.

The illumination of the receiver 15 with light falling through the window and on the currently scanned portion of the control track 8, 18 or 19 will vary in dependence on the position of the scanning set including the receiver 15 relative to the scale member, i.e., along the scale 6. The signal generated by the receiver 15 will exhibit a similar change so that each length portion of the scale 6 is defined in absolute terms by an associated level of the signal that is generated by the receiver 15. The evaluating unit may be used to control a machine control system or a display unit 20. It may be provided with bi-directional counters and/or with a computer. In the evaluating unit the analog measured-value signals received via the lines 11, 12 are electronically or arithmetically subdivided and are converted to digital countable signals and the counting direction is determined by a direction detector which indicates the direction of the scanning movement. A reference mark for generating an effective reference signal is selected by the reference signal delivering circuit 17, by which a reference pulse which has been generated by the receiver 14 in response to the scanning of a reference mark 7 will not be delivered to the evaluating unit 13 unless a corresponding enabling signal is received by the circuit 17 via an input line 21 from a selecting circuit, which is represented in the circuit diagram by solid lines and comprises a comparator 22, which has one input for receiving the output signal of the receiver 15 and another input, to which a signal level is applied which is adjustable by a level adjuster element 23, which in the illustrated embodiment consists of an adjustable potentiometer. The reference signal delivering circuit 17 will not be rendered conductive unless the present level agrees with the level of the signal which is received from the receiver 15 and in that case the reference mark pulse which has been generated in response to the scanning of that reference mark which is associated with that preset level will be rendered effective.

Other levels may be stored in a memory of the evaluating unit 13, in most cases as digital data, and after a conversion to analog values may be applied to the second input of the comparator 22 via the line 24 represented by a dotted line. An input unit 25 is connected in the line 24 and may be used to deliver a write-in instruction to the scanning unit 2 or the reference signal delivering circuit 17 when it is in a position to scan a reference mark 7 which is to be selected. In response to such write-in instruction the level of the signal which appears at the receiver 15 as that reference mark is scanned will be detected and converted and stored in the memory of the evaluating unit 13. Alternatively, all of the various levels may be stored which are associated with respective reference marks 7 and the control circuit may be operated to read the memory at those addresses which are associated with the selected reference marks. In all cases those reference marks which are to be utilized for a generation or delivery of a reference pulse may be selected without a need for a mechnical intervention into the encapsulated measuring system.

We claim:

1. In an incremental measuring system comprising
   a scale member provided with an incremental scale, with a reference track, which is parallel to said scale and contains a plurality of reference marks associated with respective reference points, and a control track, which is parallel to said scale,
   a scanning unit, which is mounted to be movable relative to said scale member along said scale and comprises scale-scanning means for scanning said scale by a predetermined scanning method and for generating measured-value signals in response to the scanning of said scale, reference track scanning means for scanning said reference track by said method and for generating reference mark signals in response to the scanning of said reference marks, and control track scanning means for scanning said control track,
   an evaluating circuit for deriving digital countable signals from said measured-value signals, and
   a reference signal delivering circuit for delivering reference signals in response to only a selected one of said reference mark signals under the control of said control track scanning means,
   the improvement residing in that said control track scanning means are operable to scan said control track by said scanning method, said control track has portions which are disposed adjacent to respective ones of said reference marks and have different signal generating characteristics, said control track scanning means are operable to generate control signals having a predetermined parameter which has different values in response to the scanning of different ones of said portions of said control track, and a selector circuit is provided, which is adapted to selectively provide any of said different values of said predetermined parameter and to inhibit the delivery of a reference signal by said reference signal dilivering circuit unless said control track scanning means generate a control signal in which said parameter has the same value as said selectively provided value.

2. The improvement set forth in claim 1 as applied to a length measuring system.

3. The improvement set forth in claim 1, wherein said scanning method is an optoelectronic scanning method.

4. The improvement set forth in claim 3, wherein said control track comprises a bar pattern having a bar density which varies along said scale.

5. The improvement set forth in claim 3, wherein said control track comprises a bar pattern having a bar width which varies along said scale.

6. The improvement set forth in claim 3, wherein said control track comprises a bar pattern having a bar density and a bar width which vary along said scale.

7. The improvement set forth in claim 3, wherein said control track comprises a dot pattern having a dot density which varies along said scale.

8. The improvement set forth in claim 3, wherein said control track comprises a dot pattern having a dot size which varies along said scale.

9. The improvement set forth in claim 3, wherein said control track comprises a dot pattern having a dot density and a dot size which vary along said scale.

10. The improvement set forth in claim 1, wherein said selector circuit comprises memory means for selectively providing any of said signal values.

11. The improvement set forth in claim 1, wherein said selector circuit comprises adjustable means for selectively providing any of said signal values.

12. The improvement set forth in claim 1, wherein said selector circuit comprises a comparator circuit for inhibiting the delivery of said reference signal unless said control track scanning means generate a control signal having an amplitude value which equals said selectively provided signal value.

13. The improvement set forth in claim 1, wherein said control track has a signal generating characteristic which varies continuously along said scale.

14. The improvement set forth in claim 1, wherein said portions of said control track register with respective ones of said reference marks and said control track is blank between adjacent ones of said portions.

15. In a scale member for use in an incremental measuring system, which scale member is provided with an incremental scale, with a reference track, which is parallel to said scale and contains a plurality of reference marks associated with respective reference points, and a control track, which is parallel to said scale, wherein said scale and said reference track are adapted to be scanned by an optoelectronic scanning method, the improvement residing in that said control track is adapted to be scanned by said optoelectronic scanning method and has portions which are disposed adjacent to respective ones of said reference marks and have different signal generating characteristics.

produced by a pattern which consists of discrete pattern elements and which varies along said scale in at least one of the parameters consisting of the pattern element density and pattern element size.

16. The improvement set forth in claim 15, wherein said pattern comprises a bar pattern having a bar density which varies along said scale.

17. The improvement set forth in claim 15, wherein said pattern comprises a bar pattern having a bar width which varies along said scale.

18. The improvement set forth in claim 15, wherein said pattern comprises a bar pattern having a bar density and a bar width which vary along said scale.

19. The improvement set forth in claim 15, wherein said pattern comprises a dot pattern having a dot density which varies along said scale.

20. The improvement set forth in claim 15, wherein said pattern comprises a dot pattern having a dot size which varies along said scale.

21. The improvement set forth in claim 15, wherein said pattern comprises a dot pattern having a dot density and a dot size which vary along said scale.

* * * * *